(No Model.)

O. M. MATTFELDT & H. H. LURSSEN.
EXPANSION GEAR WHEEL.

No. 568,623. Patented Sept. 29, 1896.

WITNESSES:—
Lee J. Van Horn.
Charles B. Mann Jr.

INVENTORS:—
Otto M. Mattfeldt
Herman H. Lurssen
By Chas. B. Mann
ATTORNEY.

UNITED STATES PATENT OFFICE.

OTTO M. MATTFELDT AND HERMAN H. LURSSEN, OF MOUNT WASHINGTON, MARYLAND.

EXPANSION GEAR-WHEEL.

SPECIFICATION forming part of Letters Patent No. 568,623, dated September 29, 1896.

Application filed May 18, 1896. Serial No. 592,086. (No model.)

*To all whom it may concern:*

Be it known that we, OTTO M. MATTFELDT and HERMAN H. LURSSEN, citizens of the United States, residing at Mount Washington, in the county of Baltimore and State of Maryland, have invented certain new and useful Improvements in Expansion Gear-Wheels, of which the following is a specification.

This invention relates to improvements in expansion-wheels for transmitting power.

The invention is adapted for both pulleys and sprocket-wheels.

In order that the invention may be clearly understood, reference is now made to the accompanying drawings, in which—

Figure 1:
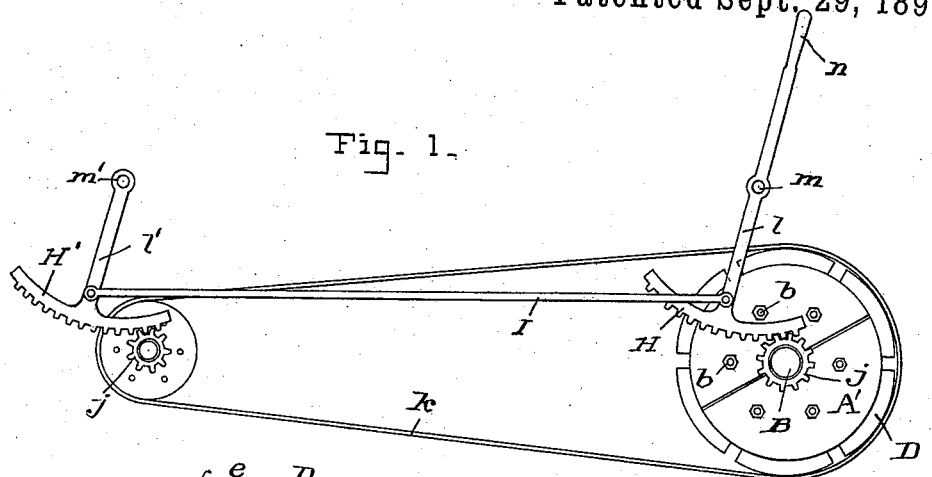
Figures 2, 3:
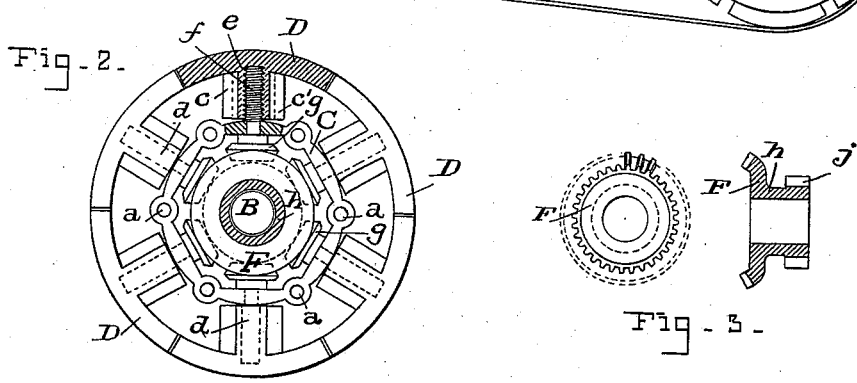
Figure 4:
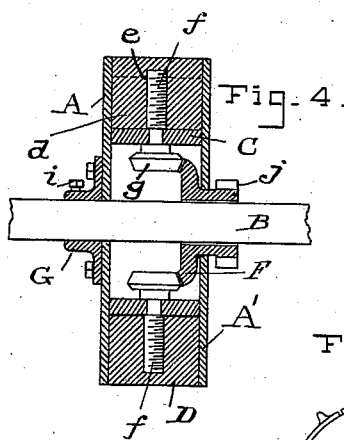
Figure 5:
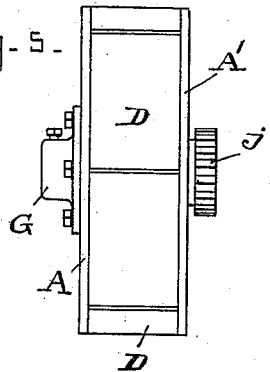
Figure 6:
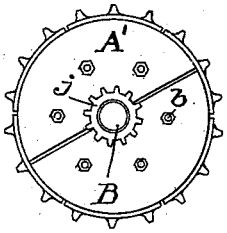

Figure 1 is a side view showing two pulleys made according to our invention and mechanism for effecting their expansion and contraction. Fig. 2 is an interior view of one of the pulleys, showing the operative parts. One side of the pulley is removed to give this interior view. Fig. 3 shows two views of the master bevel-pinion. Fig. 4 is a diametrical section of the pulley on a shaft. Fig. 5 is an edge view of the pulley. Fig. 6 is a side view of a sprocket-wheel.

The wheel or pulley has two circular flat side plates A A'. One of these may be made in two sections joined on a diametrical line. At the center these plates have a hole for the shaft B, and between the two plates and concentric with the center hole is a ring C, which, in the present instance, is hexagon-shaped and has six bolt-holes $a$. Bolts $b$ are passed through the said two plates and through the holes $a$ in the ring, and thereby the parts are firmly held together. On their inner faces the circular plates A A' have a number of radial guides, each consisting of two parallel blocks or lugs $c\ c'$. In the present instance there are six pairs of these guides, though there may be four or five instead of six. A number of segmental rim-pieces D, in the present instance six, are employed. Each segment has a radial inward-pointing arm $d$, which fits in the guides formed by the blocks $c\ c'$ and is movable therein. Each of these arms $d$ has a screw-threaded socket $e$, into which one of the screws $f$ enter. These screws have a round neck which fits and turns in a hole or bearing in the said ring C, so that the screw can revolve, but not advance, and the inner end of each screw has a bevel-pinion $g$. It will be seen, therefore, that six small bevel-pinions $g$ are inside of said ring C. A master bevel-pinion F has a hollow hub $h$, through which the main shaft B extends. This master-wheel engages with all of the six pinions $g$, and when the master-wheel is turned loosely around the shaft it revolves said pinions and turns all of the screws $f$, and thereby causes the segments D to expand or contract, according to the direction the screws turn.

The wheel or pulley is made fast to the shaft B by a flanged collar G on the shaft, which is screwed to the circular side plate A and is prevented from turning on the shaft by well-known suitable means, such as a key and groove or a set-screw $i$.

The hub of the bevel master-wheel F projects through the center hole of the said plates A' to the outside, and the exterior part of said hub is provided with a pinion $j$. The mechanism for turning the master-wheel therefore connects with the outside pinion.

In Fig. 1 two of our expansion-pulleys are shown, one larger than the other, and connected by a belt $k$. Above each pulley is a segment-rack. The one at the large pulley is designated H and the one at the small pulley H'. Each segment-rack engages with the pinion $j$ on the master-wheel of one of the pulleys, and each has an arm $l\ l'$, which is pivoted at $m\ m'$, respectively, to a suitable bar or other stationary part. (Not shown.) Thus each segment-rack hangs pendent from its pivot and can swing.

It is proper to state that while the two expansion-pulleys shown in Fig. 1 have the same construction illustrated in Fig. 2 they differ in one respect, namely, the screws $f$ of one pulley are threaded in the usual right-hand fashion, while the screws of the other pulley are threaded left hand. This reverse manner of threading the screws is for a purpose hereinafter mentioned. A rod I connects the two pivoted segment-racks. The arm of one of the racks has an extension forming a handle or lever $n$ by which to swing the rack and force its teeth to act on and turn the pinion $j$ and master-wheel, and thereby turn all the screws $f$ in the wheel and change the position of all of the rim-segments D. The movement of the handle or lever $n$ will shift both segment-racks and thus simultaneously change the adjustment of the rim-segments of both wheels, and in view of the provision of having the screws $f$ of one pulley reversely threaded from those on the other pulley one wheel will be expanded and the other wheel contracted.

We may apply our new and improved construction to either belt-pulleys or chain-wheels, like the sprocket shown in Fig. 6, and we may apply the improvements to any purpose or to any piece of machinery for which it is suited.

Having thus described our invention, what we claim as new, and desire to secure by Letters Patent, is—

The combination of the two side plates each having a central hole; a ring between the said two plates and concentric with said center holes; bolts through the ring securing the said plates together; a number of segment rim-pieces each having an inward screw-threaded socket; a number of screws each fitting in one of the sockets and having a bearing in the said ring so as to revolve but not advance and each screw provided on its inner end and inside of said ring with a pinion; and a master-pinion engaging all of said screw-pinions and having a lateral hub through which a shaft extends, said hub projecting outside of one of the side plates.

In testimony whereof we affix our signatures in the presence of two witnesses.

OTTO M. MATTFELDT.
HERMAN H. LURSSEN.

Witnesses:
CHARLES B. MANN, Jr.,
LEE I. VAN HORN.